(12) United States Patent
Shi

(10) Patent No.: US 12,215,861 B2
(45) Date of Patent: Feb. 4, 2025

(54) HEAT PIPE FOR SUBMERGED COMBUSTION BURNER

(71) Applicant: Owens-Brockway Glass Container Inc., Perrysburg, OH (US)

(72) Inventor: Liming Shi, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 413 days.

(21) Appl. No.: 17/548,690

(22) Filed: Dec. 13, 2021

(65) Prior Publication Data
US 2023/0184429 A1    Jun. 15, 2023

(51) Int. Cl.
| F23D 14/78 | (2006.01) |
| C03B 5/235 | (2006.01) |
| F23D 14/22 | (2006.01) |
| F28D 15/04 | (2006.01) |
| F28F 1/42 | (2006.01) |
| F23C 3/00 | (2006.01) |

(52) U.S. Cl.
CPC ............ F23D 14/78 (2013.01); C03B 5/2356 (2013.01); F23D 14/22 (2013.01); F28D 15/043 (2013.01); F28F 1/42 (2013.01); *F23C 3/004* (2013.01); *F27M 2001/07* (2013.01)

(58) Field of Classification Search
None
See application file for complete search history.

(56) References Cited

U.S. PATENT DOCUMENTS

| 3,607,209 | A | 9/1971 | Lazaridis |
| 3,801,446 | A * | 4/1974 | Sparber ............... F28D 15/04 136/202 |
| 4,497,475 | A | 2/1985 | Fuchs et al. |
| 5,261,602 | A * | 11/1993 | Brent ................... C10J 3/506 239/132.3 |
| 2020/0407257 | A1 * | 12/2020 | Rashley ............. F23D 14/78 |

FOREIGN PATENT DOCUMENTS

| EP | 3517497 A1 * | 7/2019 | ............ C01B 13/11 |
| EP | 3885650 A1 * | 9/2021 | ............ C03B 5/2356 |

OTHER PUBLICATIONS

CN 113465787 machine translation, Yan, Xiao-ke, Horizontal Potassium Heat Pipe, Oct. 2021 (Year: 2021).*

* cited by examiner

*Primary Examiner* — Queenie S Dehghan

(57) ABSTRACT

A submerged combustion burner, a submerged combustion melter including the submerged combustion burner, and method of operating the submerged combustion burner are disclosed. The submerged combustion burner includes central burner tube and a heat pipe that surrounds and extends beyond a terminal end of the central burner tube. When received in a burner opening defined in a melting tank of a submerged combustion melter, the heat pipe of the submerged combustion burner is disposed between the central burner tube and the floor of the melting tank. The heat pipe transfers or pumps heat via a sealed working fluid to a cooling fluid that thermally communicates with the heat pipe exterior to the melting tank.

16 Claims, 5 Drawing Sheets

HEAT PIPE FOR SUBMERGED COMBUSTION BURNER

TECHNICAL FIELD

This patent application discloses devices and methods for use in melting glass, and more particularly, to combustion burners designed for a submerged combustion melter.

BACKGROUND

Glass manufacturing involves melting a batch material at high temperatures to produce molten glass that is quite corrosive. The manufacturing process thus requires equipment that can withstand harsh conditions. One of the main pieces of equipment used to manufacture glass articles is the furnace. In one particular arrangement, the furnace may be a submerged combustion melter (SCM) in which an air-fuel or oxygen-fuel mixture is injected directly into a glass melt contained within the melter through submerged burners. The combustion gases create a high-heat transfer rate and turbulent mixing of the molten glass as they are forcibly discharged through the glass melt. A flow of molten glass is ultimately output from the furnace and may be delivered to a finer, an intermediate stilling tank, or some other downstream equipment, particularly if glass containers are being formed from the outflow of molten glass.

SUMMARY OF THE DISCLOSURE

In one aspect of the present disclosure, a combustion burner includes a central burner tube and a heat pipe that surrounds and extends beyond a terminal end of the central burner tube. The central burner tube includes a terminal end and defines an internal passage. The heat pipe includes a forward end, which is positioned axially beyond the terminal end of the central burner tube, and a rearward end, which overlaps with the central burner tube. The heat pipe comprises a working fluid sealed therein. Additionally, the combustion burner includes an outer tube that surrounds the central burner tube and connects to the rearward end of the heat pipe. Together, the outer tube and the heat pipe define an annular space around the central burner tube. The internal passage of the central burner tube directs a flow of one of a fuel or an oxidant through the burner tube while the annular space around the central burner tube directs a flow of the other of a fuel or an oxidant.

In another aspect of the present disclosure, a submerged combustion melter includes (i) a melting tank having a floor defining a burner opening and (ii) a submerged combustion burner. The submerged combustion burner comprises a central burner tube and a heat pipe. The central burner tube extends along a longitudinal axis to a terminal end, and the heat pipe surrounds and extends beyond the terminal end of the heat pipe such that the heat pipe is disposed between the terminal end of the central burner tube and the floor of the melting tank. The heat pipe includes a forward end, which is positioned axially beyond the terminal end of the central burner tube, and a rearward end, which overlaps with the central burner tube. The heat pipe further comprises a working fluid sealed therein. In terms of its construction, the heat pipe may, in one embodiment, include a housing, a wick carried within the housing, and have the working fluid carried and sealed within the housing while being in fluid communication with the wick.

In accordance with another aspect of the present disclosure, a method of operating a submerged combustion burner includes several steps. One step of the method involves providing a submerged combustion melter that includes a melting tank and a submerged combustion burner received in a burner opening defined by a floor of the melting tank. The submerged combustion burner comprises a central burner tube and a heat pipe that surrounds the central burner tube with the heat pipe being disposed between the central burner tube and the floor of the melting tank. Another step of the method involves providing a flow of either a fuel or an oxidant through an internal passage of the central burner tube. Still another step of the method involves providing a flow of the other of the fuel or the oxidant through an annular space outside of the central burner tube such that the flow of the fuel and the flow of the oxidant mix together downstream of a terminal end of the central burner tube to create a fuel and oxidant mixture. Yet another step of the method involves discharging combustion products of the fuel and oxidant mixture into a glass melt contained within the melting tank. And still another step of the method involves directing a cooling fluid into thermal communication with the heat pipe exterior to the melting tank.

BRIEF DESCRIPTION OF THE DRAWINGS

The disclosure, together with additional objects, features, advantages and aspects thereof, will be best understood from the following description, the appended claims, and the accompanying drawings, in which:

DETAILED DESCRIPTION

Figure 1:
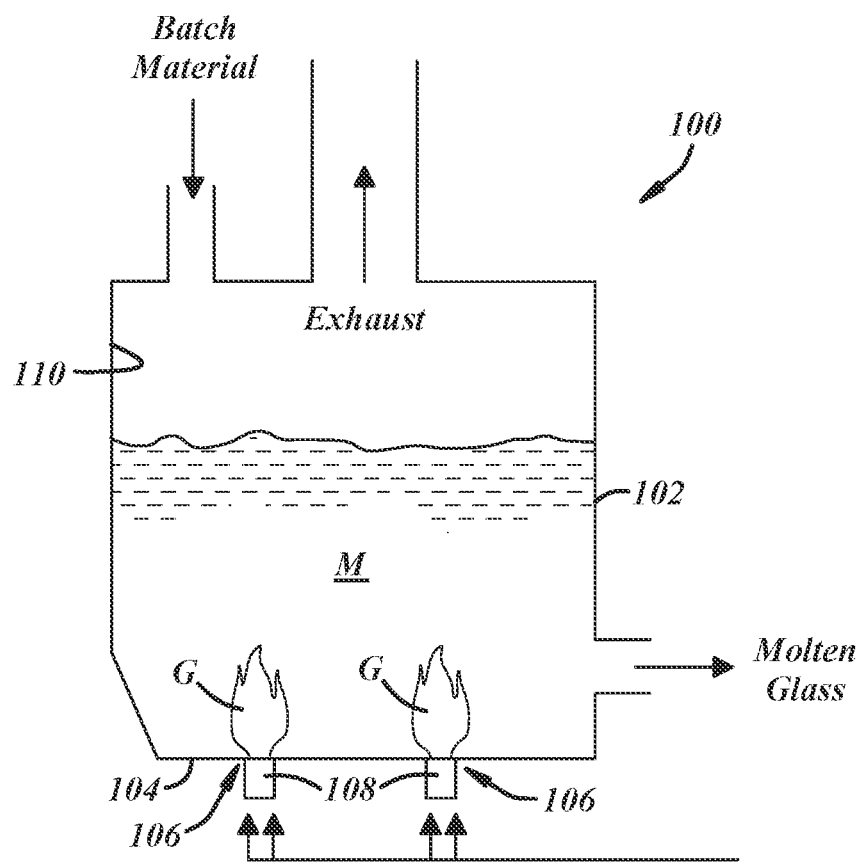
FIG. 1 is a side cross-sectional view of a submerged combustion melter that includes a combustion burner in accordance with an illustrative embodiment of the present disclosure.

The harsh environment within a glass melting furnace—attributable primarily to the corrosive nature of molten glass and the high temperature maintained in the furnace—can lead to wear, cracking, erosion, and/or the failure of furnace components. Temperatures in the melting furnace typically range from 1200° C. to 1650° C. or higher. What is more, in a submerged combustion melter, the combustion burners, or at least the portions of the burners that extend into the glass melt, are submerged and are thus in direct contact with the glass melt, and the glass melt is agitated by the discharge of combustion products from the submerged burners to create turbulent flow patterns within the melt.

Because the submerged combustion burners installed on a SCM are exposed to the harsh environment associated with glass melting, especially since the burners are in direct contact with the agitated glass melt, the operational lifetime of the burners is a concern. To address this concern, each of the burners typically includes a cooling tube that has a wall surrounding the coaxial fuel and oxidant flow conduits of the burner. The wall thickness of the cooling tube can be small, often in the range of 1-5 millimeters. An upper portion of the cooling tube, or the tip of the cooling tube, extends into the melter and is exposed to molten glass, and the heat flux received at this location of the cooling tube fluctuates over a wide range, for example, between 35-80 W/cm² (350-800 kW/m²). Conversely, a lower portion of the cooling tube is typically located outside of the melter in a more moderate ambient environment. Water is circulated upwards into the cooling tube to the tip, over an internal divider wall, and then back down to the lower portion of the tube, and ultimately out of the cooling tube, to absorb heat and manage the temperature at the tip of the cooling tube.

The different thermal exposures experienced by the cooling tube can adversely affect the life and operation of the associated submerged burner. For example, temperature gradients may develop across the wall of the cooling tube due to the transfer of heat from the upper portion of the cooling tube to the lower portion, and from the outside of the cooling tube to the inside of the tube, which can induce thermal stresses within the wall. These thermal stresses can cause cracking on the outside surface of the cooling tube when the cooling tube wall becomes thermally fatigued. Once formed, these cracks can propagate quickly across the cooling tube wall and the circulating coolant can leak therefrom. Furthermore, the upper portion of the coolant tube may erode over time as a result of being constantly exposed to the corrosive and high temperature glass melt contained in the SCM, which can render the cooling tube wall more susceptible to crack formation and propagation.

To reduce the tendency for cracking of the cooling tube wall, previous practices sought to minimize the temperature along the upper portion of the cooling tube as much as possible. One way to decrease the temperature of the upper portion of the cooling tube as well as the thermal gradient across the cooling tube wall is to increase the thermal conductivity of the material used to construct the cooling tube wall. The thermal conductivity of copper, for example, is about sixteen to thirty-three times higher than the thermal conductivity of stainless steel. To that end, when the cooling tube wall is constructed of copper, the average temperature at the outside surface of the upper portion of the copper tube would be expected to be about 95° C.-100° C. when exposed to molten glass, while the same portion of a stainless steel cooling tube would be expected to have an average temperature of about 180° C.-185° C. under the same conditions. The problem with a copper cooling tube, however, is that the melting temperature of copper (1084° C.) is lower than the temperature of the glass melt contained in a SCM and other furnace types as well (>1200° C.). Other solutions are therefore needed.

In the present disclosure, a submerged combustion burner, a submerged combustion melter, and a method for cooling the combustion burner is disclosed. The combustion burner includes a fluid-cooled heat pipe that surrounds and extends beyond a terminal end of a central burner tube. When the combustion burner is received in a burner opening defined by a floor of the submerged combustion melter, the heat pipe is disposed between the central burner tube and the floor of the melter to cool the central burner tube while experiencing a mitigated potential for the types of damage (e.g., fracturing and erosion) that often accompany a conventional cooling tube. In particular, the heat pipe transfers heat away from the terminal end of the central burner tube of the submerged combustion burner to a convective cooling fluid. And since the flow of the cooling fluid extracts heat from the heat pipe outside of the melter, the likelihood of having to shut-down the melter on account of a cooling fluid leak is greatly reduced compared to conventional submerged combustion burner designs.

Referring now to the drawings, FIG. 1 illustrates a submerged combustion melter 100 that includes a melting tank 102 in which a vitrifiable batch material is melted into molten glass. While the submerged combustion melter 100 is describe herein in the context of manufacturing glass, the melter 100 may be employed to melt other materials that do not produce glass such as, for example, metal(s) and waste products. The melting tank 102 receives the vitrifiable batch material, which may include virgin raw materials (sand, soda ash, limestone, etc.) and recycled glass (i.e., cullet), plus other raw materials and minors additions as is well known in the art, from a batch charger (not shown) or some other device that can controllably feed batch material into the tank 102.

The melting tank 102 includes a floor 104 that defines at least one burner opening 106. The burner opening 106 traverses a thickness of the floor 104. Each burner opening 106 receives a corresponding submerged combustion burner 108 and enables the burner 108 to discharge combustion products G directly into a glass melt M that is contained within an interior 110 of the tank 102. Although FIG. 1 illustrates two burner openings 106 in the floor 104, more or less burner openings 106 may be disposed in the floor 104 to accommodate any desired number of submerged combustion burners 108. Each of the submerged combustion burners 108 installed in the melting tank 102 receives separate flows of a fuel and an oxidant, which in turn combust before exiting the burner 108 or immediately upon exiting the burner 108 to produce the forceful discharge of the combustion products G.

Figure 2:
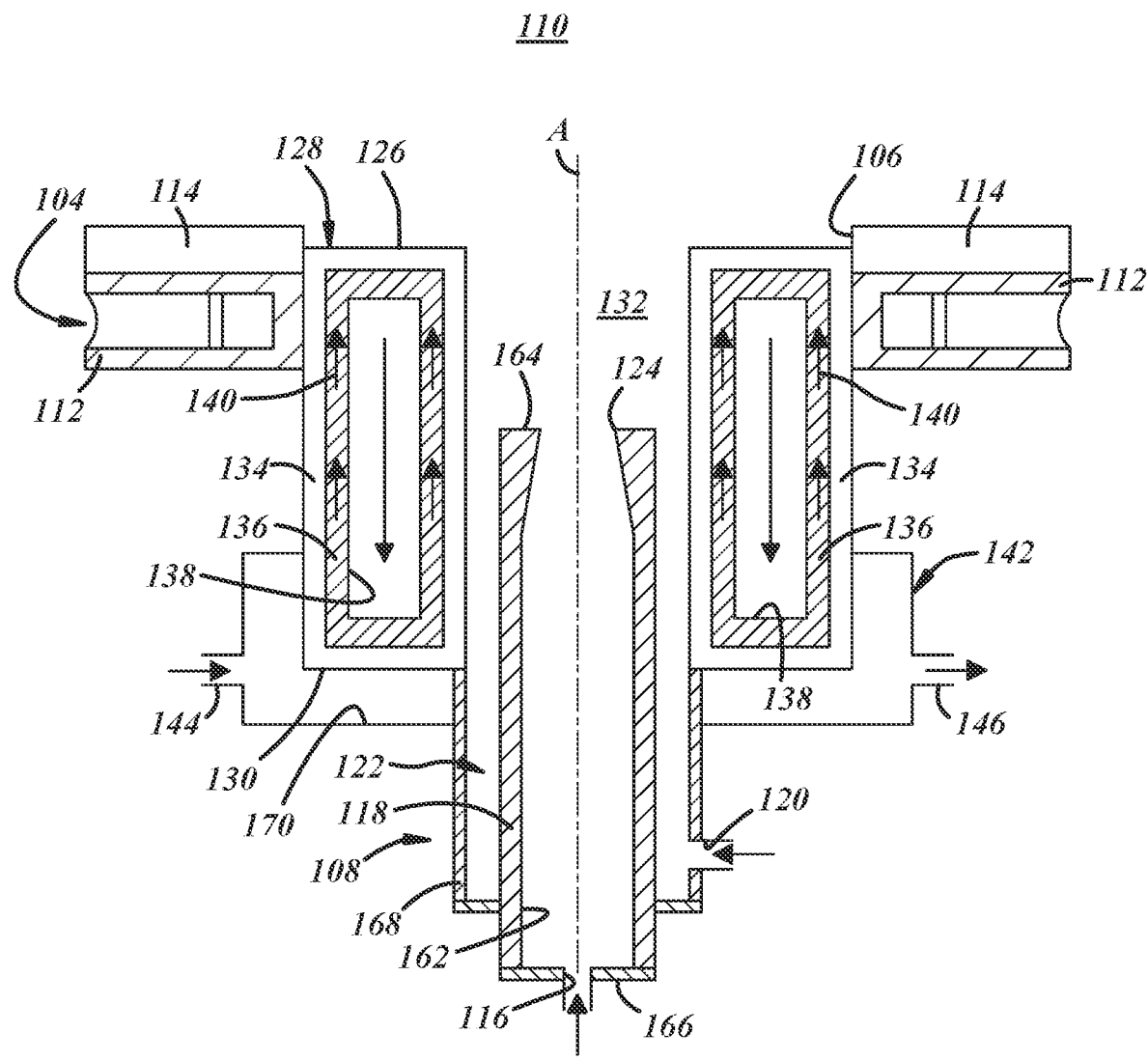
FIG. 2 is a side cross-sectional view of a combustion burner installed in a submerged combustion melter, and further showing a central burner tube, a heat pipe, and a cooling chamber of the combustion burner in accordance with an illustrative embodiment of the present disclosure.

Referring now to FIG. 2, the floor 104 may include at least one cooling panel 112 configured to internally circulate a cooling fluid such as water. The cooling panel(s) 112 provide structure to the melting tank 102 and cool a portion of the glass melt M adjacent to the floor 104 to form a layer of frozen glass 114 in contact with the floor 104. The term "frozen glass" is meant to broadly include glass that is resistant to flow including glass that is not technically frozen but nonetheless has a high enough viscosity that it behaves like frozen glass and forms a definitive layer of glass against the floor 104. In some instances, a refractory layer (not shown) may be included in the floor 104 between the cooling panel 112 and the layer of frozen glass 114. Here, the frozen layer of glass 114 protects the underlying refractory layer and/or the cooling panel 112 from erosion and/or corrosion that stems from contact with the glass melt M.

In the embodiment shown in FIG. 2, the submerged combustion burner 108 includes a central burner tube 118 that extends along a longitudinal axis A and defines an internal passage 162. The central burner tube 118 has a terminal end 164 located proximate the floor 104 of the melting tank 102 and an opposite distal end 166. Defined in the central burner tube 118 is a first inlet 116, which may be defined in the distal end 166 as shown, but is not required to be, and a first outlet 124, which is defined in the terminal end 164 and is centered on the longitudinal axis A of the central burner tube 118. Each of the first inlet 116 and the first outlet 124 fluidly communicates with the internal passage 162 of the central burner tube 118. The submerged combustion burner 108 also includes an outer tube 168 that surrounds a portion of the central burner tube 118. The outer tube 168 is coupled to the central burner tube 118 and defines a second inlet 120. The outer tube 168, which extends along the outside of the central burner tube 118 along the longitudinal axis A of the central burner tube 118, does not cover the terminal end 164 of the central burner tube 118; in other words, the terminal end 164 of the central burner tube 118 extends beyond the outer tube 168. A flow of one of a fuel (e.g., methane or propane) or an oxidant (e.g., oxygen, air, or an oxygen-enriched gas containing at least 85 vol % $O_2$) is provided to the internal passage 162 of the central burner tube 118 through the first inlet 116 and exits the internal passage 162 at the terminal end 164 of the central burner tube 118 through the first outlet 124. Additionally, a flow of the other of a fuel or an oxidant is provided around the central burner tube 118 through the second inlet 120 of the outer tube 168.

The submerged combustion burner 108 further includes a heat pipe 128 that surrounds a portion of the central burner tube 118 that is axially forward of the portion of the tube 118 surrounded by the outer tube 168. Specifically, the heat pipe 128 connects to and extends axially from the outer tube 168, and further surrounds, and extends beyond, the terminal end 164 of the central burner tube 118. The heat pipe 128 and the outer tube 168 therefore define an annular space 122 exterior to the central burner tube 118 and interior to the outer tube 168 and the heat pipe 128. The annular space 122 runs along the longitudinal axis A of the central burner tube 118 and is provided with the flow of the fuel or the oxidant, whichever the case may be, through the second inlet 120. The heat pipe 128 may be integrally formed with the outer tube 168 or it may be separable from but fluidly sealable with the outer tube 168 to facilitate easy disassembly and replacement of the component parts.

To facilitate the combustion reaction between the fuel and the oxidant, the heat pipe 128 and the central burner tube 118 further define a mixing zone 132 axially beyond the terminal end 164 of the central burner tube 118 and radially inboard of the heat pipe 128. In the mixing zone 132, the flows of the fuel and oxidant that pass through and emerge from the internal passage 162 of the central burner tube 118 and the annular space 122 outside of the central burner tube 118 can mix, ignite, and combust to produce combustion products G. When the heat pipe 128 is installed in the floor 104 of the melting tank 102 and, thus, is received in its respective burner opening 106, the heat pipe 128 is disposed between the terminal end 164 of the central burner tube 118 and the floor 104 of the melting tank 102. In this way, the combustion products G are discharged into the glass melt M from the mixing zone 132, which is surrounded by the heat pipe 128.

The heat pipe 128 includes a forward end 126 and a rearward end 130. The forward end 126 is positioned axially beyond the terminal end 164 of the central burner tube 118 and is disposed within the burner opening 106, or extends though the burner opening 106 into the interior 110 of the melting tank 102, when the burner 108 is installed in the floor 104 of the tank 102. The rearward end 130 overlaps the central burner tube 118 and is positioned axially below the terminal end 164 of the central burner tube 118. The rearward end 130 is connected to the outer tube 168 and, when the submerged combustion burner 108 is installed in the floor 104 of the melting tank 102, the rearward end 130 of the heat pipe 128 is positioned outside of the melting tank 102 as shown best in FIG. 2. As for the construction of the heat pipe 128, it may be a vacuum-tight, two-phase heat transfer device configured to pump heat from the forward end 126 to the rearward end 130 of the pipe 128 during operation of the submerged combustion burner 108. For instance, in the embodiment shown here in FIG. 2, the heat pipe 128 includes a housing 134, a wick 136, and a working fluid 140 in fluid communication with the wick 136 and sealed within the housing 134.

The housing 134 is a sealed outer wall that encompasses the wick 136 and contains the working fluid 140. The housing 134 is composed of a material having a high effective thermal conductivity that is also heat and corrosion resistant such as, for example, stainless steel, copper, silica, nickel, titanium, iron, aluminum, brass, or combinations thereof. The wick 136 is a porous capillary structure that is supported by the inside surface of the housing 134 and defines a vapor chamber 138 interiorly of the wick 136 in the center of the housing 134. The wick 136 may be a homogenous and/or a composite capillary structure. Some examples of structures suitable for use as the wick 136 include a screen-type (e.g., a wrapped screen) capillary structure, a sintered metal capillary structure, a capillary structure having axial grooves, a composite screen, screen covered grooves, and/or a porous composite slab.

The working fluid 140 is a fluid that can undergo repeated phase transitions between liquid and gas as part of a cooling or heat pump cycle. When present within the housing 134 and over the course of a cooling cycle, the working fluid 140 includes a liquid portion that soaks the wick 136 proximate the rearward end 130 of the heat pipe 128 and a vapor portion proximate the forward end 126 of the heat pipe 128. The working fluid 140, in liquid form, and is able to flow upwards towards the forward end 126 of the heat pipe 128 through the wick 136 by way of capillary action where it can evaporate to form a vapor. From there, the vaporized working fluid returns downwards towards the rearward end 130 through the vapor chamber 138 wherein it condenses back into liquid form. Some examples of a material suitable for use as the working fluid 140 include water, ammonia, acetone, methanol, ethanol, toluene, and combinations thereof.

Figures 3, 4:
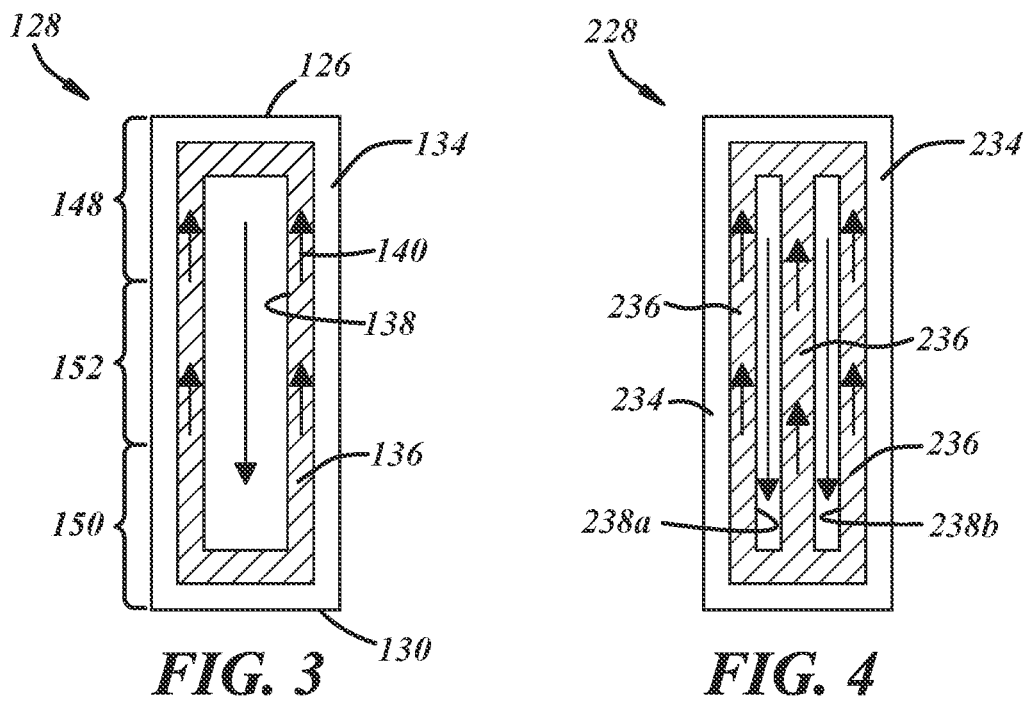
FIG. 3 is a side cross-sectional view of the heat pipe shown in FIG. 2, which as shown includes an outer case, a capillary structure, and a vapor chamber in accordance with an illustrative embodiment of the present disclosure.
FIG. 4 is a side cross-sectional view of the heat pipe shown in FIG. 2, which as shown includes an outer case, a capillary structure, and multiple vapor chambers in accordance with an illustrative embodiment of the present disclosure.

The heat pipe 128 includes an evaporator region 148 and a condenser region 150, as shown generally in FIG. 3, when the cooling or heat pump cycle has been established. The evaporator region 148 forms adjacent to the forward end 126 of the heat pipe 128 and the condenser region 150 forms adjacent to the rearward end 130 of the pipe 128. In the evaporator region 148, heat is transferred through the housing 134 of the heat pipe 128 from the glass melt M and is absorbed by the working fluid 140 that has traveled up the wick 136. The absorption of heat causes the working fluid 140 to evaporate into a vapor form (i.e., vaporized working fluid), thereby capturing the latent heat of vaporization. The vaporized working fluid then flows downwards through the vapor chamber 138 towards the condenser region 150. When the vaporized working fluid reaches the condenser region 150, which is cooler than the evaporator region 148, the vaporized working fluid condenses into a liquid form (i.e., liquefied working fluid) and releases the previously-captured latent heat of vaporization. The liquefied working fluid 140 then travels back towards the evaporator region 148 through the wick 136 via capillary action.

The flow of the working fluid 140 is shown in FIGS. 2 and 3 by the directional arrows within the wick 136 and the vapor chamber 138. The phase change process of the working fluid 140 and the two-phase flow circulation continues so long as the temperature gradient between the evaporator region 148 and the condenser region 150 is maintained. Additionally, when the two-phase flow circulation of the working fluid reaches steady-state, an adiabatic region 152 may form between the evaporator region 148 and the condenser region 150, depending on length of the heat pipe 128. The adiabatic region 152 is a region in which the net heat transfer in and the net heat transfer out is zero. For example, in a heat pipe having a length of anywhere between 0.1 meters and 1.5 meters, an adiabatic region ranging from 0 meters to 0.8 meters may form between the established evaporator and condenser regions 148, 150.

To cool the rearward end 130 of the heat pipe 128 so that the vaporized working fluid can be condensed in the condenser region 150 and the latent heat released by the condensation of the working fluid 140 can be removed through the housing 134, the submerged combustion burner 108 may include or be associated with a cooling jacket 142 located exterior to the melting tank 102, as shown in FIG. 2. The cooling jacket 142 surrounds at least a portion of the heat pipe 128 and encompasses at least the rearward end 130 of the heat pipe 128, preferably extending towards the forward end 126 to cover between 10% and 60% of an axial length of the pipe 128 to help ensure adequate cooling. The cooling jacket 142 defines an interior flow space 170 as well as a cooling fluid inlet 144 and a cooling fluid outlet 146. Each of the cooling fluid inlet 144 and the cooling fluid outlet 146 fluidly communicate with the interior flow space 170 so that a cooling fluid can be introduced into and removed from the interior flow space 170, respectively, so that the flow of the cooling fluid through the interior flow space 170 can contact and convectively extract heat from the heat pipe 128 through the housing 134. The cooling fluid used here may be water, a propylene glycol, ethylene glycol, or any other suitable heat-transfer fluid.

In operation, the heat pipe 128 functions as a good heat flux transformer with an effective thermal conductance significantly greater than copper alone due to its cooling cycle and the convective transfer of heat to the cooling fluid flowing through the cooling jacket 142 while also maintaining a high-power handling capacity. For example, when water is used as the working fluid (boiling point of 100° C.), the heat flux through the heat pipe 128 can reach approximately 400 W/cm$^2$. As a result of the high thermal conductance of the heat pipe 128, the temperature gradient between the evaporator region 148 and the condenser region 150 can be minimized along the axial length of heat pipe 128, which in turn reduces the thermal stress on the surrounded central burner tube 118. This reduced thermal stress helps reduce the occurrence of crack formation and propagation in the central burner tube 118 by slowing the onset of thermal fatigue, thus allowing the central burner tube 118 to operate for periods of time without replacement.

The submerged combustion burner 108 shown in FIGS. 2-3 includes a single heat pipe 128 that has one vapor chamber 138 for directing vaporized working fluid from evaporator region 148 to the condenser region 150 as well as a cooling jacket 142 that partially surrounds the heat pipe 128. However, other submerged combustion burner constructions that include at least one heat pipe having at least one vapor chamber and an approach for cooling the heat pipe outside of the melting tank 102 that are consistent with the description above and operate in the same general manner are possible. Certain of these alternate embodiments are shown in FIGS. 4-7. In the alternate embodiments disclosed herein, corresponding numerals among the embodiments designate like or corresponding elements throughout the several views of the drawing figures. To that end, the above descriptions of features identified in the embodiment shown in FIGS. 1-3 apply equally to features shown in FIGS. 4-7 that are identified with a corresponding reference numeral and, accordingly, the description of that common subject matter will not be repeated.

Referring now to FIG. 4, a heat pipe 228 is shown that has more than one vapor chamber. In this embodiment, the wick 236 contained within the housing 234 of the heat pipe 228 defines a first vapor chamber 238a and a second vapor chamber 238b. Here, the first vapor chamber 238a and the second vapor chamber 238b are radially spaced apart and separated by a portion of the wick 236. While two vapor chambers 238a, 238b are shown in FIG. 4 and described here, the wick 236 may define more than two vapor chambers if desired. Each of the several vapor chambers 238a, 238b present in this embodiment of the heat pipe 228 functions similarly to direct vaporized working fluid from the evaporator region 148 of the heat pipe 228 to the condenser region 150.

Figure 5A:
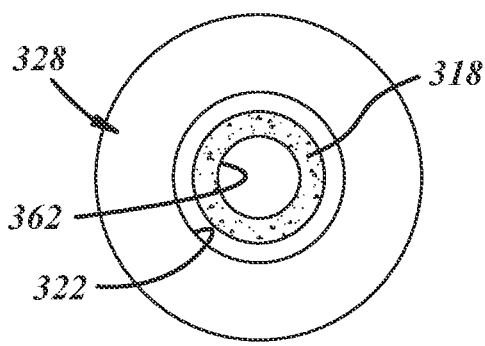
FIG. 5A is a top cross-sectional view of the heat pipe of the combustion burner and further illustrating a hollow cylindrical configuration of the heat pipe in accordance with an illustrative embodiment of the present disclosure.
Figure 5B:
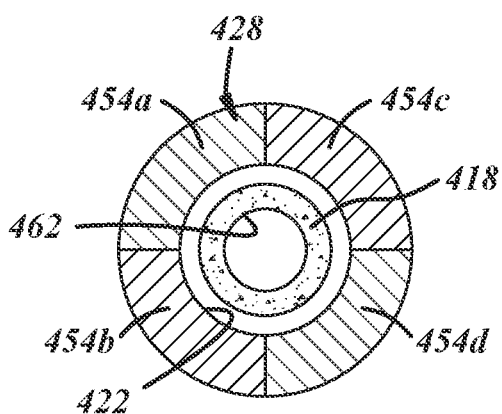
FIG. 5B is a top cross-sectional view of the heat pipe of the combustion burner and further illustrating a hollow cylindrical configuration of the heat pipe with multiple sections in accordance with an illustrative embodiment of the present disclosure.
Figure 5C:
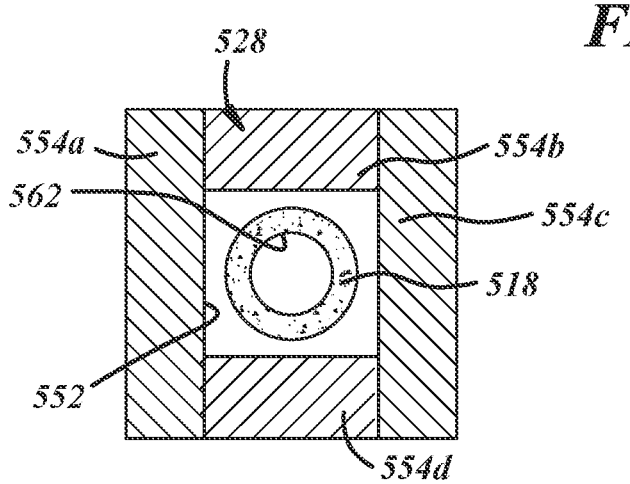
FIG. 5C is a top cross-sectional view of the heat pipe of the combustion burner and further illustrating a hollow square configuration of the heat pipe in accordance with an illustrative embodiment of the present disclosure.
Figure 5D:
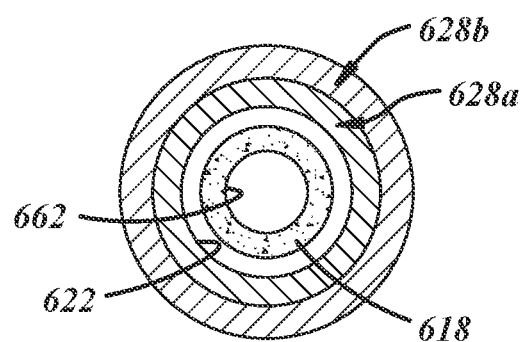
FIG. 5D is a top cross-sectional view of the heat pipe of the combustion burner and further illustrating two concentric sections of the heat pipe with each section having a hollow cylindrical configuration in accordance with an illustrative embodiment of the present disclosure.

Referring now to FIGS. 5A-5D, there are shown several different embodiments of a submerged combustion burner (in top cross-sectional views) that may be used in the submerged combustion melter 100 according to the present disclosure. In the embodiment shown in FIG. 5A, a heat pipe 328 is shown that surrounds the central burner tube 318 and partially defines the annular space 322 as described above. The heat pipe 328 is unitary in construction and may include one vapor chamber 138 or multiple vapor chambers 238 as described above in FIGS. 1-3 and FIG. 4, respectively. In the embodiment shown in FIG. 5B, a heat pipe 428 is shown that includes a plurality of arcuate sections fastened together. Here, the heap pipe 428 is constructed from four arcuate sections 454a, 454b, 454c, 454d, each of which forms a circumferential part of the heat pipe 428 as a whole. Each section 454a, 454b, 454c, 454d may include a wick that defines a respective vapor chamber, thereby providing the pipe 428 with a plurality of circumferentially spaced vapor chambers (i.e., one per section), or the several sections 454*a*, 454*b*, 454*c*, 454*d* may include respective wicks that together define a single circumferentially continuous vapor chamber when sections 454*a*, 454*b*, 454*c*, 454*d* are fastened together. The heat pipe 528 shown in FIG. 5C is similar to the heat pipe shown in FIG. 5B except that the plurality of sections 554*a*, 554*b*, 554*c*, 554*d* are linear in shape and arranged to provide the heat pipe 528 with a rectangular cross-section when sectioned perpendicular to the axial length of the heat pipe 528 rather than a circular cross-section. Lastly, in the embodiment shown in FIG. 5D, a plurality of heat pipes 628 is included in the submerged combustion burner. The plurality of heat pipes 628 includes an inner heat pipe 628*a* and an outer heat pipe 628*b* disposed radially outwardly of the inner heat pipe 628*a*. Here, the inner heat pipe 628*a* surrounds the central burner tube 618 and partially defines the annular space 622, as described above, while the outer heat pipe 628*b* surrounds the inner heat pipe 628*a* to provide an additional layer of thermal protection to the central burner tube 618.

Figure 6:
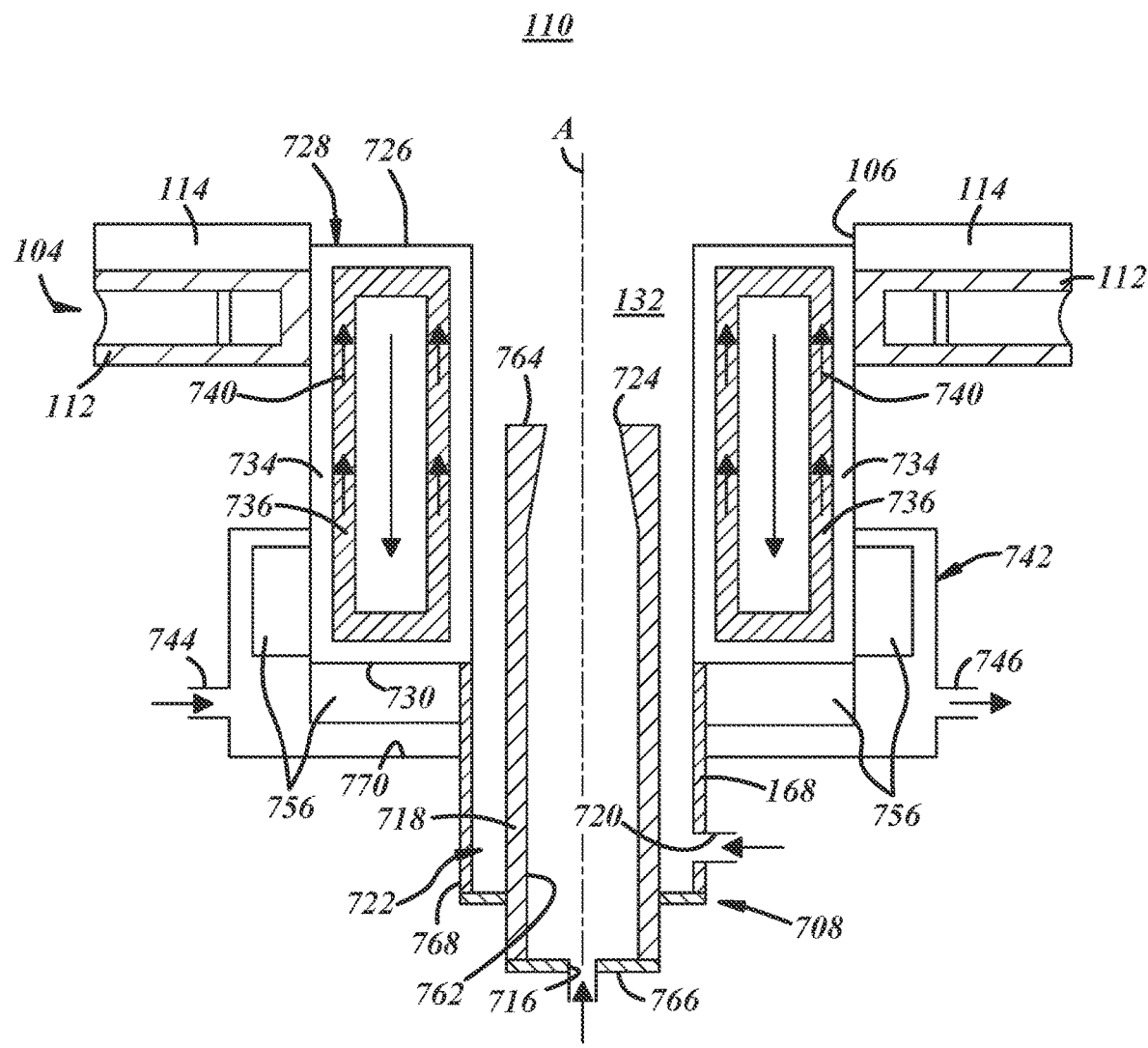
FIG. 6 is a side cross-sectional view of a combustion burner installed in a submerged combustion melter and further showing a central burner tube, a heat pipe, a cooling chamber, and multiple cooling fins of the combustion burner in accordance with another illustrative embodiment of the present disclosure.

Referring now to FIG. 6, a submerged combustion burner 708 is shown that has a modified cooling jacket 742 relative to the burner 108 shown in FIGS. 1-3. In the submerged combustion burner 708 shown here, one or more cooling fins 756 are coupled to the heat pipe 728 within the interior flow space 770 of the cooling jacket 742 that encompasses the rearward end 730 of the heat pipe 728. The cooling fin(s) 756 are formed from a material having high thermal conductance—such as, for example, stainless steel, copper, silica, nickel, titanium, iron, aluminum, and brass—and is preferably configured to provide a large surface area for the transfer of heat out of the heat pipe 728 and into the cooling fluid being passed through the cooling jacket 742. Specifically, when present, the cooling fluid thermally communicates with the cooling fin(s) 756 via direct or indirect contact as the cooling fluid passes through the cooling jacket 742 and, in doing so, the cooling fin(s) 756 help extract heat through the housing 734 of the heat pipe 728 from the working fluid 740 as the working fluid 740 condenses and additionally help deliver the extracted heat to the cooling fluid, possibly more efficiently than if the cooling fin(s) 756 are omitted. Each of the one or more cooling fins 756 may be an integral projection that extends outwardly from the housing 734 of the heat pipe 728. For example, as shown here, the cooling fin(s) 756 may include a first cooling fin 756 that extends axially from the rearward end 730 of the heat pipe 728 and a second cooling fin 756 that extends radially outwardly from a side of the heat pipe 728 with both fins 756 further surrounding the central burner tube 718.

Figure 7:
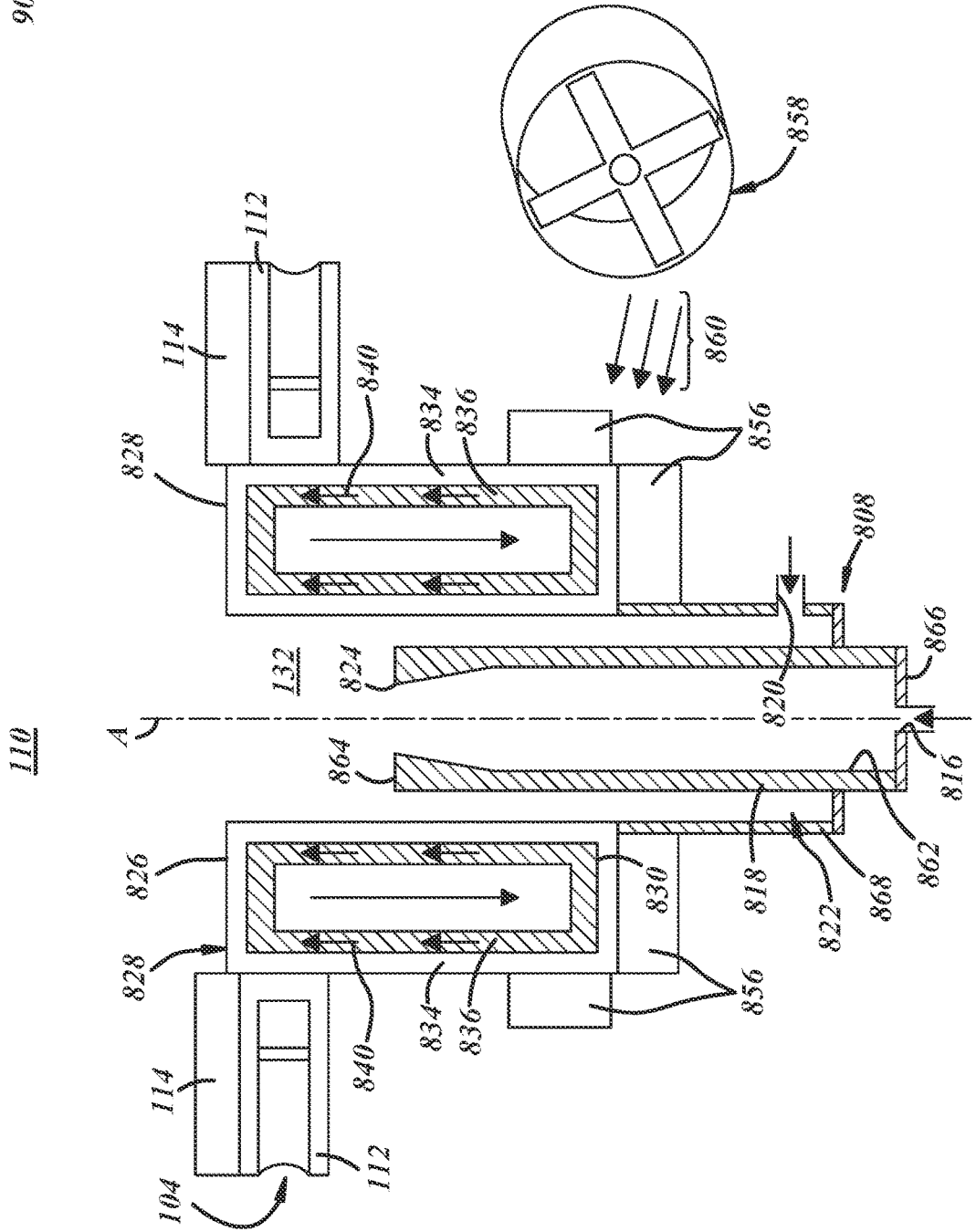
FIG. 7 is a side cross-sectional view of a combustion burner installed in a submerged combustion melter and further showing a central burner tube, a heat pipe, and multiple cooling fins of the combustion burner in accordance with an illustrative embodiment of the present disclosure, while also showing a fan associated with the combustion burner.

Turning now to FIG. 7, a submerged combustion burner 808 is shown that omits the cooling jacket shown in the embodiment of FIG. 6 but adds an air circulation device 858, such as a fan, to pass a flow of air 860 over and in thermal communication with the heat pipe 828 and the cooling fin(s) 856 that extend from the heat pipe 828 exterior to the melting tank 102. The air circulation device 858 may be part of or separate from the melting tank 102 and the flow of air 860 it distributes over the heat pipe 828 and the cooling fin(s) 856 convectively remove heat from the heat pipe 828 and the fin(s) 856 and transfer the heat to the ambient environment.

Figure 8:
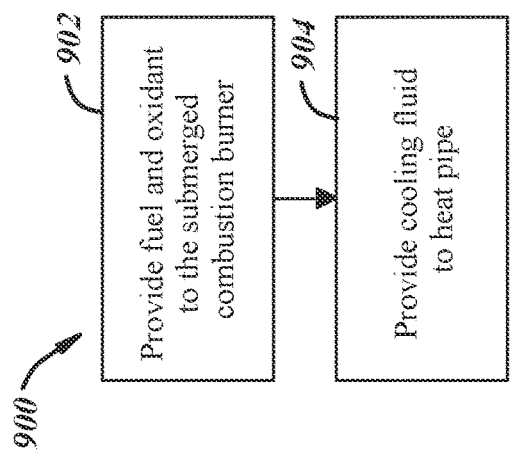
FIG. 8 is a flow diagram showing various steps of an illustrative embodiment of a method for cooling the combustion burner according to the present disclosure.

FIG. 8 illustrates a method 900 of cooling a submerged combustion burner 108, 208, 308, 408, 508, 608 708, 808 that includes a heat pipe 128, 228, 328, 428, 528, 628 728, 828. For purposes of illustration and clarity, the method 900 will be described in the context of the submerged combustion melter 100 and the submerged burner 108 depicted in FIGS. 1-4. The described method 900 is of course applicable to each of the other submerged burners 208, 308, 408, 508, 608, 708, 808 described above, as well as others not described herein and shown in the drawings, in the same manner as will be apparent to a person of ordinary skill in the art.

Method 900 includes a step 902 of providing a flow of either a fuel or an oxidant through the internal passage 162 of the central burner tube 118, and providing a flow of the other of the fuel or the oxidant through the annular space 122 outside of the central burner tube 118 such that the flow of the fuel and the flow of the oxidant mix together downstream of the terminal end 164 of the central burner tube 118 to create a fuel and oxidant mixture that is directed into the glass melt M contained within the submerged combustion melter 100. In one arrangement, the fuel is introduced into the internal passage 162 of the central burner tube 118 through the first inlet 116 and exits the internal passage through the first outlet 124, while the oxidant is introduced into the annular space 122 through the second inlet 120 and flows along the outside of the central burner tube 118. The fuel and the oxidant mix together in the mixing zone 132 and the resultant combustion products G are discharged into the glass melt M.

Method 900 also includes a step 904 of providing the cooling fluid to the heat pipe 128 that is disposed between the central burner tube 118 of the submerged combustion burner 108 and the floor 104 of the submerged combustion melter 110 and is configured to cool the central burner tube 118. The cooling fluid may be a liquid or a gas that flows through the cooling jacket 142 that surrounds part of the heat pipe 128 exterior to the submerged combustion burner 108 or, in an alternate embodiment, the cooling fluid may be a flow of air supplied by the flow circulation device 858. Because the combustion products G provide a large amount of heat to the glass melt M, and thermal gradients induced in the portion of the burner 108 that contacts or is in very close proximity to the glass melt M can be damaging, the ability of the heat pipe 128 to pump heat from the central burner tube 118 by the mechanisms described above to help minimize the formation and steepness of any thermal gradients may help protect the burner 108 and extend its operating lifetime.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The drawings are not necessarily shown to scale. The disclosure is intended to embrace all such modifications and variations as fall within the spirit and broad scope of the appended claims.

The invention claimed is:

1. A submerged combustion burner, comprising:
a central burner tube extending along a longitudinal axis and including a terminal end, the central burner tube defining an internal passage;
a heat pipe that surrounds and extends beyond the terminal end of the central burner tube, the heat pipe including a forward end, which is positioned axially beyond the terminal end of the central burner tube, and a rearward end, which overlaps with the central burner tube, the heat pipe comprising a working fluid sealed therein; and an outer tube that surrounds the central burner tube and connects to the rearward end of the heat pipe, the outer tube and the heat pipe defining an annular space around the central burner tube;

wherein the internal passage of the central burner tube directs a flow of one of a fuel or an oxidant through the central burner tube while the annular space directs a flow of the other of the fuel or the oxidant.

2. The submerged combustion burner set forth in claim 1, wherein the heat pipe comprises a housing, a wick carried within the housing and defining at least one vapor chamber, and wherein the working fluid is carried and sealed within the housing and is in fluid communication with the wick.

3. The submerged combustion burner set forth in claim 2, wherein the wick defines a plurality of vapor chambers.

4. The submerged combustion burner set forth in claim 2, wherein the heat pipe further comprises a cooling jacket that surrounds at least a portion of the heat pipe and defines an interior flow space.

5. The submerged combustion burner set forth in claim 4, wherein the heat pipe includes one or more cooling fins that extend outwardly from the housing, and wherein the one or more cooling fins are located within the interior flow space defined by the cooling jacket.

6. The submerged combustion burner set forth in claim 1, wherein the central burner tube defines a first inlet to the internal passage and a first outlet from the internal passage, and wherein the outer tube defines a second inlet to the annular space around the central burner tube.

7. The submerged combustion burner set forth in claim 1, wherein the working fluid comprises at least one of water, ammonia, acetone, methanol, ethanol, toluene, or combinations thereof.

8. A submerged combustion melter, comprising:
a melting tank having a floor that defines a burner opening;
a submerged combustion burner received in the burner opening such that combustion products discharged from the submerged combustion burner are directed into an interior of the melting tank, the submerged combustion burner comprising a central burner tube and a heat pipe, the central burner tube defining an internal passage and extending along a longitudinal axis to a terminal end, and the heat pipe surrounding and extending beyond the terminal end of the central burner tube such that the heat pipe is disposed between the terminal end of the central burner tube and the floor of the melting tank, the heat pipe including a forward end, which is positioned axially beyond the terminal end of the central burner tube, and a rearward end, which overlaps with the central burner tube, the heat pipe comprising a working fluid sealed therein.

9. The submerged combustion melter set forth in claim 8, wherein the at least one heat pipe comprises a housing, a wick carried within the housing and defining at least one vapor chamber, and wherein the working fluid is carried and sealed within the housing and is in fluid communication with the wick.

10. The submerged combustion melter set forth claim 9, wherein the heat pipe further comprises a cooling jacket that surrounds at least a portion of the heat pipe exterior to the melting tank and defines an interior flow space.

11. The submerged combustion melter set forth in claim 10, wherein the heat pipe includes one or more cooling fins that extend outwardly from the housing, and wherein the one or more cooling fins are located within the interior flow space.

12. The submerged combustion melter set forth in claim 9, further comprising an air circulation device that directs a flow of air over and in thermal communication with the heat pipe.

13. The submerged combustion melter set forth in claim 12, wherein the heat pipe includes one or more cooling fins that extend outwardly from the housing and are disposed to be in thermal communication with the flow of air directed from the air circulation device.

14. The submerged combustion melter set forth in claim 8, wherein the forward end of the heat pipe is disposed within the burner opening or extends beyond the burner opening into the interior of the melting tank, and the rearward end of the heat pipe is positioned outside of the melting tank.

15. The submerged combustion melter set forth in claim 14, wherein the heat pipe includes an evaporator region and a condenser region, the evaporator region being located adjacent to the forward end of the heat pipe and the condenser region being located adjacent to the rearward end of the heat pipe, and wherein the working fluid evaporates into a vapor in the evaporator region and condenses into a liquid in the condenser region.

16. The submerged combustion melter set forth in claim 8, wherein the submerged combustion melter further comprises an outer tube that surrounds the central burner tube and connects with the rearward end of the heat pipe such that the outer tube and the heat pipe define an annular space around the central burner tube.

* * * * *